Oct. 15, 1940.  H. SMALLS  2,218,409

MULTIPLE PICTURE FRAME

Filed Aug. 12, 1939   2 Sheets-Sheet 1

INVENTOR
Helen Smalls
BY
ATTORNEY

Oct. 15, 1940.  H. SMALLS  2,218,409
MULTIPLE PICTURE FRAME
Filed Aug. 12, 1939  2 Sheets—Sheet 2
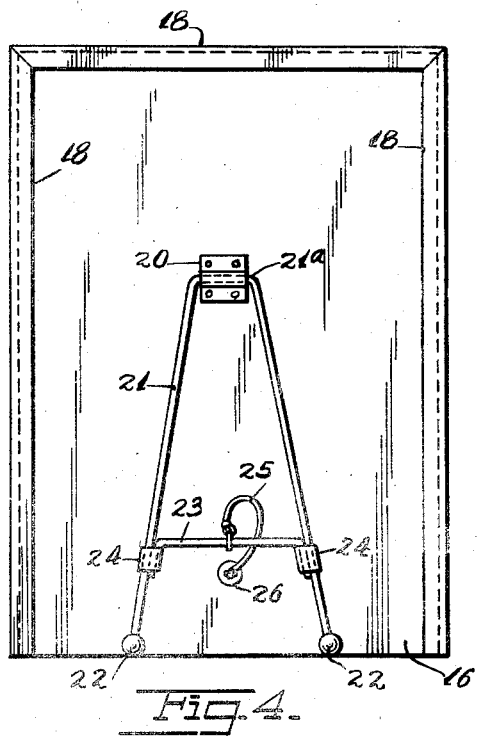
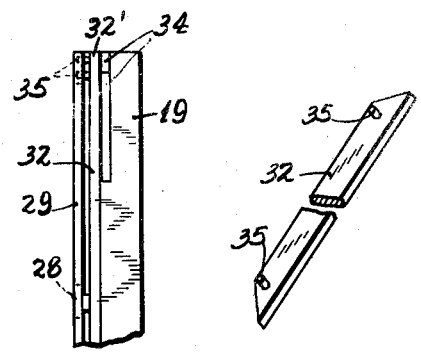
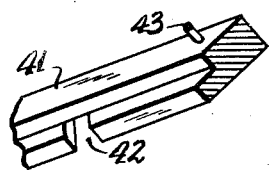
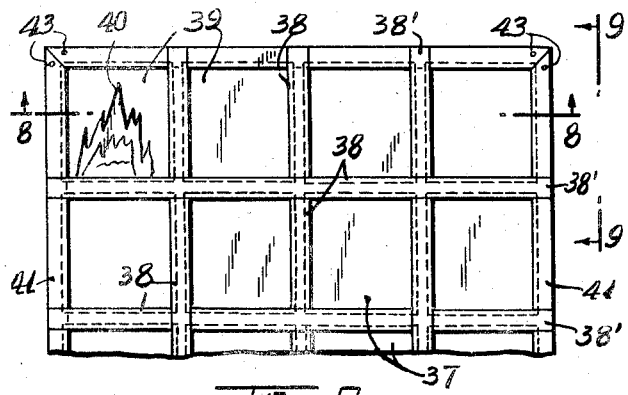
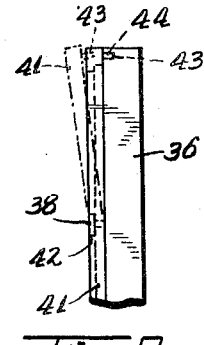
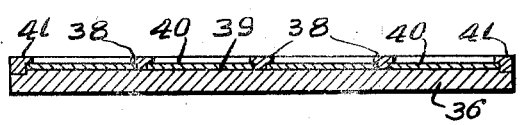
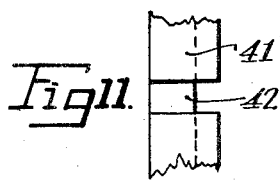
INVENTOR
Helen Smalls
BY
ATTORNEY Patented Oct. 15, 1940

2,218,409

UNITED STATES PATENT OFFICE 2,218,409

MULTIPLE PICTURE FRAME

Helen Smalls, New York, N. Y.

Application August 12, 1939, Serial No. 289,738

10 Claims. (Cl. 40—152)

This invention relates to new and useful improvements in a multiple picture frame.

The invention has for an object the construction of a multiple picture frame which is characterized by a flat body having a central opening in which a picture may be framed and a novel arrangement whereby pictures may be engaged about said central opening and upon said picture frame.

More specifically the invention contemplates the use of lateral cross bar T-shaped strips mounted in a certain way upon the flat body of the picture frame so that pictures may be slipped into position and be held by the lateral extending portions of the cross bar T-shaped strips.

Still further the invention contemplates a novel arrangement of closure strips extending along grooves in the edges of the picture frame in a way so that the pictures which are arranged around said picture frame may be secured in position.

Still further the invention proposes another arrangement for holding the pictures in position on said multiple picture frame.

Another object of this invention resides in the construction of a multiple picture frame, as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a rear elevational view of the picture frame shown in Fig. 1.

Fig. 5 is a fragmentary edge elevational view looking in the direction of the line 5—5 of Fig. 1.

Fig. 6 is a perspective view of one of the closure strips used in the device.

Fig. 7 is a fragmentary front elevational view of a multiple picture frame constructed in accordance with another form of this invention.

Fig. 8 is a horizontal sectional view taken on the line 8—8 of Fig. 7.

Fig. 9 is a fragmentary edge elevational view looking in the direction of the line 9—9 of Fig. 7.

Fig. 10 is a fragmentary perspective view of one of the edge strips used in the device.

Fig. 11 is a partial elevational view of an edge strip used in connection with the modification of this invention.

Figures 1, 2:
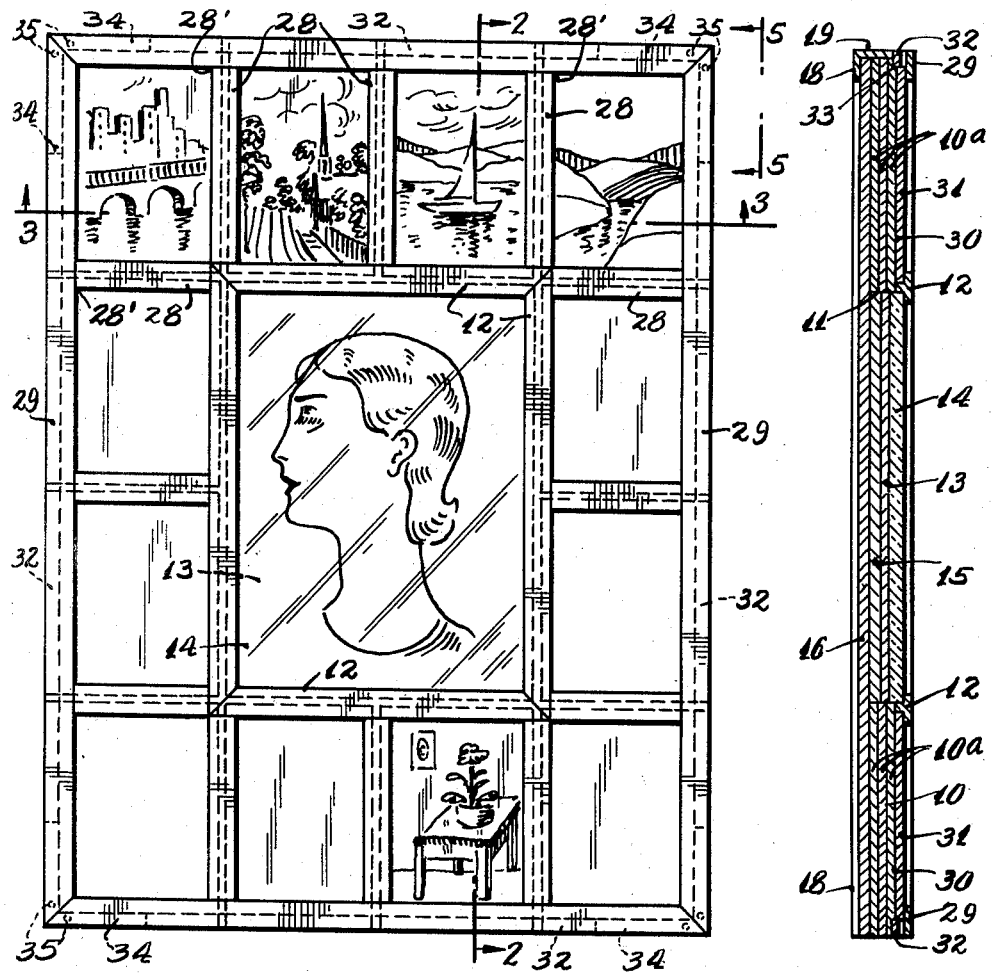
Fig. 1 is a front elevational view of a multiple picture frame constructed in accordance with this invention.
Fig. 2 is a vertical sectional view taken on the line 2—2 of Fig. 1.
Figure 3:
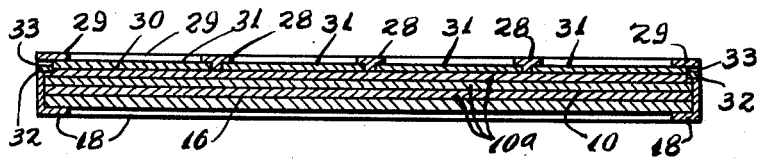
Fig. 3 is a horizontal sectional view taken on the line 3—3 of Fig. 1.

The multiple picture frame in accordance with this invention, illustrated in Figs. 1 to 6 inclusive, includes a flat body 10, preferably formed from several plies of wood or plastics, metals, etc. As illustrated on the drawings the flat body 10 is formed from three plies 10$^a$. This flat body is formed with a central opening 11. Central T-shaped strips 12 are mounted at the bottoms of their stems upon the flat body 10 and particularly extend around the edge portions of the opening 11. These central T-shaped strips 12 are arranged upon the front face of the body 10.

A picture 13 is adapted to be framed in the central opening of the flat body. This is accomplished with a pane of glass 14 engaged into the opening 11 from the rear side so that the edges of the pane of glass engage the inwardly extending head portions of the T-shaped strips 12. The picture 13 is then placed against the rear face of the glass 14. A backing sheet 15 is then inserted into the opening 11 and is of a thickness, or several layers thereof may be used, so as to fill up the entire height of the opening 11. A main backing sheet 16 is secured across the rear of the picture frame and serves to hold the backing sheet 15 and the adjacent picture 13 and the glass 14 in position.

The main backing sheet 16 is removably mounted upon the rear of the picture frame. This is accomplished by several L-shaped flange strips 18 extended around the sides and the top end of the picture frame. These flange strips 18 have one of their arms 19 secured to the edges of the flat body 10. The other arm of the flange strips 18 are directed inwards parallel to the body 10 and have their face spaced from the back face of the body 10. The arrangement is such that the back cover 16 may be slipped laterally downwards and out from the open bottom side of the flange strips 18.

A stand is provided upon the back cover 16 by which the picture frame may be rested on a desk, table or other article. This stand includes a bracket 20 mounted upon the back cover 16 and supporting an inverted U-shaped wire frame 21. A central portion 21$^a$ of this wire frame hingedly engages through the bracket 20. The bottom ends of the wire frame are provided with knobs 22 which act as feet upon which the frame may rest.

A transverse bar 23 is secured across the side arms of the wire frame 21 by several clamps 24. A flexible element such as a string or chain 25 is attached at one end to the transverse bar 23 and at the other end to an anchorage member 26 mounted on the back cover 16. The arrangement is such that the frame 21 may be hinged rearwards to extend rearwards at an inclination so that the picture frame may be rested in a vertical, and slightly rearwards inclined position, on a flat surface.

A plurality of lateral T-shaped strips 28 are mounted at the bottoms of their stems upon the front face of the flat body 10. These lateral T-shaped strips 28 extend from the sides of the central T-shaped strips 12 to the edges of the body 10. Edge strips 29 extend around the edges of the body 10 and are mounted on the outer ends of the lateral T-shaped strips 28. More specifically the outer ends of the lateral T-shaped strips 28 are recessed at the points 28' and the edge strips 29 merely rest upon the stem portions of the lateral strips 28. These edge strips are glued, cemented or in any other similar fashion attached to the stems of the strips 28 outside of the points 28'. This construction is such that a plurality of picture pockets 30 are formed about the body 10 and each of these pockets has its mouth opening in the edge of the body 10. Pictures 31 are shown engaged in some of these picture pockets. It should be noted that the edge portions of the pictures engage beneath the projecting head portions of the T-shaped strips.

Closure strips 32 extend in grooves 33 formed along the edges of the body 10 for closing the mouth openings of the pockets 30. Each of these closure strips 32 is frictionally mounted in a manner so that they may be removed when desired for sliding out the individual pictures. More specifically the edge strips 19 and the flat body 10 at the corners of the picture frame are formed with cutout areas 34. A small stud 35 is mounted upon each end of each closure strip 32 and normally engages in a receiving opening formed in the adjacent face of the edge strips 29. The arrangement is such that the end portions 32' of each of the closure strips 32 may be slightly flexed by gripping the same with one's finger nail. The end portion 32' may be flexed into the cutout 34, until the pins 35 disengage from the opening. Then the closure strip may be moved laterally outwards and in this way the closure strip may be removed from the groove 33.

In Figs. 7 to 10 inclusive, a modified form of the invention has been disclosed which distinguishes in several ways from the preferred form. In accordance with this form of the invention the multiple picture frame includes a flat body 36 having central openings 37 in which central pictures may be framed. A plurality of lateral T-shaped strips 38 are mounted at the bottoms of their stems upon the front face of the body 36, and extend to the edges of the flat body. In this form of the device all picture openings are arranged to be the same size.

These T-shaped strips 38 divide off pocket areas 39 into which pictures 40 may be slipped. The mouths of these pocket areas are disposed along the edges of the picture frame. Edge strips 41 are mounted in certain ways upon the edges of the body 36 for closing the open sides of the pocket openings 39. More specifically the outer ends of each of the lateral T-shaped strips 38 have overhanging edge portions 38' which are formed by cutting away portions of the stems of the T-shaped strips so that only the cross head portion extends to the edges of the body 36. The edge strips 41 are formed with recessed areas 42 at the points where the overhanging ends 38' project. The arrangement is such that the edge strips 41 may be slipped out or placed in position. A novel means is provided for holding these strips as desired.

More specifically, the means mentioned at the end of the previous paragraph includes pins 43 mounted upon the end of the edge strips 41 and normally engaging into receiving openings 44 formed in the flat body 36. The resiliency of the end portions of the edge strips 41 is normally depended upon to maintain the pins 43 in position in the openings 44. To remove the edge strips 41 it is necessary that the end portions be flexed outwards as indicated by the dot and dash lines in Fig. 9. This will remove the pins 43 from the opening 44. Then the edge strips 41 are free to be moved outwards. The mouth openings of the pockets 39 are then exposed. Pictures may be removed and reinserted as desired. The edge strips may be engaged in position when desired.

It is to be understood that the removable recessed edge closure strips may be only on one or at all four edges of the picture frame and that all strippings and cross bars may be in the form of a decorative moulding of any size or shape.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A multiple picture frame, comprising a flat body having a central opening, central T-shaped strips mounted at the bottoms of their stems and extending around said opening and disposed on the front face of said flat body, lateral T-shaped strips mounted at the bottoms of their stems and extending from the sides of said central T-shaped strips to the edges of said body, edge strips extending around the edges of said body, said lateral T-shaped strips at their outer ends having their tops cut away to expose their stems and said edge strips being mounted on the exposed portions of said stems, whereby a plurality of picture pockets are formed about said body and having mouth openings at the edges of said body, and closure strips extending in grooves along the edges of said body for closing said mouth openings.

2. A multiple picture frame, comprising a flat body having a central opening, central T-shaped strips mounted at the bottoms of their stems and extending around said opening and disposed on the front face of said flat body, lateral T-shaped strips mounted at the bottoms of their stems and extending from the sides of said central T-shaped strips to the edges of said body, edge strips extending around the edges of said body, said lateral T-shaped strips at their outer ends having their tops cut away to expose their stems and said edge strips being mounted on the exposed portions of said stems, whereby a plurality of picture pockets are formed about said body and having mouth openings at the edges of said body, and closure strips extending in grooves along the edges of said body for closing said mouth openings, said lateral T-shaped strips being parallel to each other.

3. A multiple picture frame, comprising a flat body having a central opening, central T-shaped strips mounted at the bottoms of their stems and extending around said opening and disposed on the front face of said flat body, lateral T-shaped strips mounted at the bottoms of their stems and extending from the sides of said central T-shaped strips to the edges of said body, edge strips extending around the edges of said body, said lateral T-shaped strips at their outer ends having their tops cut away to expose their stems and said edge strips being mounted on the exposed portions of said stems, whereby a plurality of picture pockets are formed about said body and having mouth openings at the edges of said body, and closure strips extending in grooves formed by the space between said edge strips and said body for closing said mouth openings, said body being formed with recessed areas adjacent the end portions of said closure strips, pins mounted upon the end portion of said closure strips and engaging portions of the adjacent edge strips for maintaining the position of the closure strips, whereby the end portion of the closure strips may be flexed into said recessed areas to disengage the pins and then the closure strips may be moved laterally and removed.

4. A multiple picture frame, comprising a flat body having a central opening, central T-shaped strips mounted at the bottoms of their stems and extending around said opening and disposed on the front face of said flat body, lateral T-shaped strips mounted at the bottoms of their stems and extending from the sides of said central T-shaped strips to the edges of said body, edge strips extending around the edges of said body, said lateral T-shaped strips at their outer ends having their tops cut away to expose their stems and said edge strips being mounted on the exposed portions of said stems, whereby a plurality of picture pockets are formed about said body and having mouth openings at the edges of said body, closure strips extending in grooves formed by the space between said edge strips and said body for closing said mouth openings, L-shaped flange strips being mounted on the sides and top of said body, said flange strips having one of their arms secured to the edges of said body and the other of their arms directed inwards across the back face of said body and spaced therefrom, and a back cover for said body having its edges engaged in the space formed by said latter-mentioned arms and said body.

5. A multiple picture frame, comprising a flat body having a central opening, central T-shaped strips mounted at the bottoms of their stems and extending around said opening and disposed on the front face of said flat body, lateral T-shaped strips mounted at the bottoms of their stems and extending from the sides of said central T-shaped strips to the edges of said body, edge strips extending around the edges of said body, said lateral T-shaped strips at their outer ends having their tops cut away to expose their stems and said edge strips being mounted on the exposed portions of said stems, whereby a plurality of picture pockets are formed about said body and having mouth openings at the edges of said body, closure strips extending in grooves formed by the space between said edge strips and said body for closing said mouth openings, L-shaped flange strips being mounted on the sides and top of said body, said flange strips having one of their arms secured to the edges of said body and the other of their arms directed inwards across the back face of said body and spaced therefrom, and a back cover for said body having its edges engaged in the space formed by said latter-mentioned arms and said body, said back cover being adapted to hold a central picture in said frame and in the central opening of said flat body.

6. A multiple picture frame, comprising a flat body, a plurality of lateral T-shaped strips mounted on said body and extending to the edges thereof and at the edges having overhanging ends, and edge strips with inward directed flanges extending along the edges of said body and having recessed areas into which said overhanging ends engage.

7. A multiple picture frame, comprising a flat body, a plurality of lateral T-shaped strips mounted on said body and extending to the edges thereof and at the edges having overhanging ends, edge strips with inward directed flanges extending along the edges of said body and having recessed areas into which said overhanging ends engage, pins mounted upon the end portions of said edge strips and engaging receiving openings formed in said flat body holding the edge strips in position, and the end portions of said edge strips being flexible to be capable of being flexed outwards to disengage the pins and then the edge strips may be moved laterally free from said overhanging ends.

8. A multiple picture frame, comprising a flat body, a plurality of lateral T-shaped strips mounted on said body and extending to the edges thereof and at the edges having overhanging ends, and edge strips with inward directed flanges extending along the edges of said body and having recessed areas into which said overhanging ends engage, said overhanging ends being formed by cutting away the stem portions of said lateral T-shaped strips.

9. A multiple picture frame, comprising a flat body, a plurality of lateral T-shaped strips mounted on said body and extending to the edges thereof and at the edges having overhanging ends, and edge strips with inward directed flanges extending along the edges of said body and having recessed areas into which said overhanging ends engage, said edge strips being frictionally held in place so that they hold the pictures in position and may be removed for sliding out the individual pictures.

10. A multiple picture frame, comprising a flat body, a plurality of spaced T-shaped strips mounted at the bottom of their stems horizontally across the front face of said body, a plurality of spaced T-shaped strips mounted at the bottom of their stems vertically across the front face of said body and between said strips forming pockets for receiving and individually holding pictures, said pockets having mouth openings adjacent the edges of said body through which said pictures are adapted to be passed to be mounted in or removed from said pockets, and closure strips removably mounted on the edges of said body and extending across said mouth openings for closing said mouth openings to prevent said pictures from accidentally falling from said pockets.

HELEN SMALLS.